(12) United States Patent
DiFoggio

(10) Patent No.: US 9,903,977 B2
(45) Date of Patent: Feb. 27, 2018

(54) RADIATION INDUCED CONDUCTIVITY OF OIL BASED MUD AROUND PADS OF ELECTRICAL IMAGING TOOLS

(71) Applicant: BAKER HUGHES INCORPORATED, Houston, TX (US)

(72) Inventor: Rocco DiFoggio, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 65 days.

(21) Appl. No.: 15/177,173

(22) Filed: Jun. 8, 2016

(65) Prior Publication Data
US 2017/0357024 A1    Dec. 14, 2017

(51) Int. Cl.
G01V 3/20    (2006.01)
G01V 5/12    (2006.01)
G01V 5/10    (2006.01)

(52) U.S. Cl.
CPC ............... G01V 3/20 (2013.01); G01V 5/10 (2013.01); G01V 5/12 (2013.01)

(58) Field of Classification Search
CPC . G01V 3/00; G01V 3/08; G01V 3/081; G01V 3/10; G01V 3/101; G01V 3/102; G01V 3/104; G01V 3/105; G01V 3/107; G01V 3/108; G01V 3/15; G01V 3/16; G01V 3/165; G01V 5/12; G01V 5/125; G01V 5/08; G01V 5/00; G01N 33/2823; G01N 21/274; E21B 49/005; E21B 49/08; E21B 47/102; E21B 43/2403; E21B 43/2635; E21B 47/1015; E21B 47/00; E21B 49/00; E21B 7/002; E21B 7/20;
(Continued)

(56) References Cited

U.S. PATENT DOCUMENTS 2,739,120 A    3/1956 Fischer
5,595,680 A    1/1997 Bryant et al.
(Continued)

OTHER PUBLICATIONS

Doll, H.G., "The Laterolog: A New Resistivity Logging Method With Electrodes Using an Automatic Focusing System," T.P. 3198, vol. 192, pp. 305-316 (1951).
Doll, H.G., "The Microlaterolog," T.P. 3492, vol. 198, pp. 17-32 (1953).
Adamczewski, I., "Induced Conduction in Dielectric Liquids," Brit. J. Appl. Phys. vol. 16, pp. 759-770 (1965).
Schmidt, Werner F. et al., "Yield of Free Ions in Irradiated Liquids; Determination by a Clearing Field," Jnl of Physical Chemistry vol. 78, No. 11, pp. 3730-3736 (1968).
Schmidt, Werner F. et al., "Free-Ion Yields in Sundry Irradiated Liquids," Jnl of Chemical Physics 52, vol. 5, pp. 2345-2351 (1970).
(Continued)

*Primary Examiner* — Tung X Nguyen
*Assistant Examiner* — Robert P Alejnikov, Jr.
(74) *Attorney, Agent, or Firm* — Mossman, Kumar & Tyler, PC

(57) ABSTRACT

Methods, systems, devices, and products for making formation resistivity measurements including reducing the resistivity of the fluid proximate the electrode using ionizing radiation to induce a transient increase in electrical conductivity of the fluid for the resistivity measurement. The fluid may include oil-based mud. Methods include making the downhole measurement using the electrode during the transient increase. An electrode may be disposed on a pad having a bremsstrahlung assembly disposed thereon. Methods may include mitigating effects of an electrical resistivity of the fluid on the formation resistivity measurement by using the radiation to induce a transient increase in electrical conductivity of the fluid for the formation resistivity measurement. Methods may include using the ionizing radiation to generate at least one of: i) free ions; and ii) free electrons.

8 Claims, 6 Drawing Sheets

(58) Field of Classification Search
CPC ... E21B 43/2401; E21B 36/04; G01T 1/1648;
G06T 11/005; E21C 37/06; E21C 37/08;
E21C 37/12; A61B 6/583; E21D 9/1093
USPC ...... 324/323–375; 175/41; 250/269.3, 269.4;
73/152.05, 152.06; 166/247, 248, 250.01
See application file for complete search history.

(56) References Cited

U.S. PATENT DOCUMENTS

| | | | |
|---|---|---|---|
| 6,006,831 A | 12/1999 | Schlemmer et al. | |
| 6,029,755 A | 2/2000 | Patel | |
| 6,060,885 A | 5/2000 | Tabarovsky et al. | |
| 6,608,005 B2 | 8/2003 | Palmer et al. | |
| 6,691,805 B2 | 2/2004 | Thaemlitz | |
| 6,925,384 B2 | 8/2005 | Frenkel et al. | |
| 7,112,557 B2 | 9/2006 | Thaemlitz | |
| 7,579,841 B2 | 8/2009 | San Martin et al. | |
| 8,763,695 B2 | 7/2014 | Van Zanten | |
| 2010/0001211 A1* | 1/2010 | Huang | B82Y 15/00 250/492.1 |
| 2010/0126717 A1* | 5/2010 | Kuchuk | E21B 49/008 166/250.03 |
| 2012/0095687 A1* | 4/2012 | LeCompte | G01V 11/00 702/7 |

OTHER PUBLICATIONS

Casanovas, J. et al., "Dependence of Frelon Yield on Electrical Field Strength in a Dielectric Liquid Irradiated by 60Co γ Rays," Jnl of Chemical Physics vol. 63, No. 8, pp. 3673-3675 (1975).

Allen, A.O., "Yields of Free Ions Formed in Liquids by Radiation," Nat'l Standard Reference Data, Nat'l Bureau of Standards, 20 pp., (1976).

Holroyd, R.A. et al., "Ion Yields in Hydrocarbon Liquids Exposed to X-rays of 5-30-keV Energy," Jnl of Phys. Chem. vol. 89, pp. 2909-2913 (1985).

Gee, Norman et al., "Electron Mobilities, Free Ion Yields, and Electron Thermalization Distances in Liquid Long-Chain Hydrocarbons," J. Chem. Phys., vol. 86, No. 10, pp. 5716-5721 (1987).

Knoesel, Ernst et al., "Conductivity of Solvated Electrons in Hexane Investigated With Terahertz Time-Domain Spectroscopy," Jnl of Chemical Physics, vol. 121, No. 1, pp. 394-404 (2004).

Heo, Sung Hwan et al., "A Vacuum-Sealed Miniature X-Ray Tube Based on Carbon Nanotube Field Emitters," Nanoscale Research Letters 7:258, 5 pp. (2012).

* cited by examiner

RADIATION INDUCED CONDUCTIVITY OF OIL BASED MUD AROUND PADS OF ELECTRICAL IMAGING TOOLS

FIELD OF THE DISCLOSURE

This disclosure generally relates to borehole tools, and in particular to methods and apparatuses for conducting downhole measurements.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, fluid analysis, monitoring and controlling the tool itself, and so on.

SUMMARY OF THE DISCLOSURE

In aspects, the present disclosure is related to methods and apparatuses for estimating at least downhole parameter relating to an earth formation intersected by a borehole, such as, for example, a resistivity parameter.

One general embodiment according to the present disclosure may include a method of making a formation resistivity measurement. The measurement may be made in a borehole filled with fluid using an electrode. The electrode may be part of a galvanic sensor, which may be incorporated into a pad of an electrical imaging tool.

Methods may include reducing the resistivity of the fluid proximate the electrode using ionizing radiation to induce a transient increase in electrical conductivity of the fluid for the resistivity measurement. The fluid may be substantially non-conductive in nominal operation. The fluid may include oil-based mud. The method may include making the downhole measurement using the electrode during the transient increase.

Methods may include generating the ionizing radiation with a radiation source for at least one of i) immediately before the resistivity measurement, and ii) during the resistivity measurement. The downhole measurement may be taken within 5 microseconds of application of radiation. The ionizing radiation may include at least one of i) X-rays; ii) gamma rays; iii) alpha radiation; iv) beta radiation; v) ultraviolet radiation; and vi) neutrons. The radiation source may comprise a bremsstrahlung X-ray assembly. The electrode may be disposed on a pad having the bremsstrahlung assembly disposed thereon. Methods may include using the ionizing radiation to generate at least one of: i) free ions; and ii) free electrons.

Methods may include performing a measurement cycle comprising: i) applying the radiation over a first time interval; ii) making the resistivity measurement with the electrode while the electrical conductivity of the fluid proximate the electrode is in a target range; and iii) allowing the fluid to return to a nominal borehole conductivity by ceasing application of the radiation and waiting for a second time interval before repeating the measurement cycle.

Methods may include performing a measurement cycle comprising: i) applying the radiation continuously over a time interval; ii) conveying the electrode in the borehole during the time interval; and iii) making a resistivity measurement with the electrode over the time interval such that the electrical conductivity of the fluid proximate the electrode is in a target range during the resistivity measurement; and iv) making additional resistivity measurements with the electrode over the time interval such that the electrical conductivity of the fluid proximate the electrode is in a target range during the additional resistivity measurements.

Methods may include mitigating effects of an electrical resistivity of the fluid on the formation resistivity measurement by using the radiation to induce a transient increase in electrical conductivity of the fluid for the formation resistivity measurement.

Another general embodiment according to the present disclosure may include an apparatus for taking a downhole measurement. The apparatus may include a sensor generating signals representative of a downhole parameter; and source of ionizing radiation associated with the sensor. The sensor may include at least an electrode.

Another embodiment according to the present disclosure may include a system for taking a downhole measurement. The system may include a tool comprising: a tool body; a galvanic sensor responsive to a downhole parameter; a source of ionizing radiation associated with the sensor; circuitry configured to activate the radiation source downhole and make a measurement in a borehole intersecting an earth formation while the electrical conductivity of the fluid proximate the sensor is in a target range; and a conveyance device configured to convey the tool in the borehole. The galvanic sensor may include an electrode.

Circuitry as described above may include a processor and a non-transitory computer-readable medium product accessible to the processor comprising instructions for making measurements and/or estimating at least one downhole parameter relating to an earth formation intersected by a borehole disposed on the medium that, when executed by a processor, cause the at least one processor to execute one or more methods or method components as described herein.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
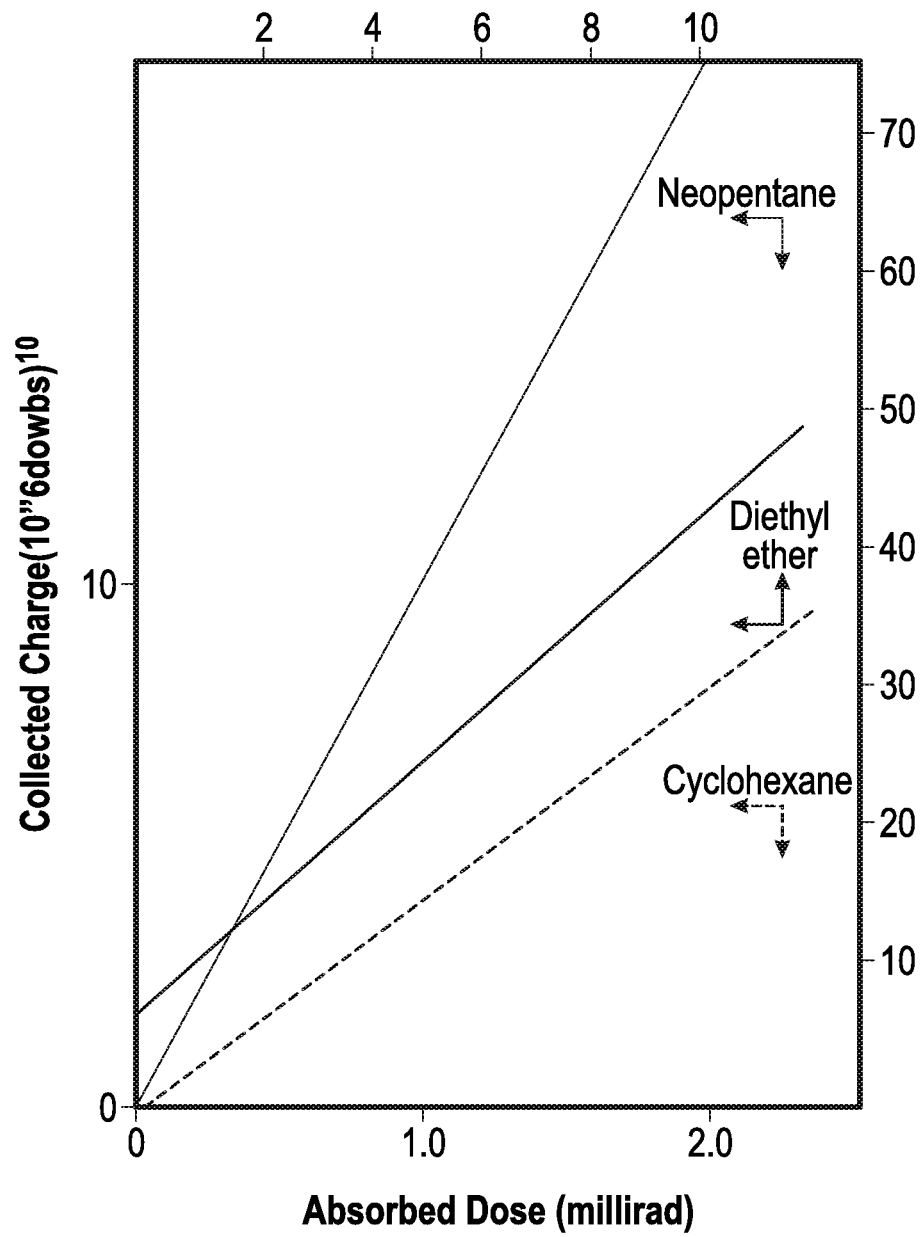
FIG. 1 shows observed charge-radiation dose curves in accordance with embodiments of the present disclosure.

In aspects, this disclosure relates to making a downhole measurement. Downhole measurement, as used herein, may be defined as a measurement taken in a borehole intersecting an earth formation indicative of a parameter of the borehole or the formation, i.e., a downhole parameter. Method embodiments may include methods of making a formation resistivity measurement in a borehole filled with fluid using an electrode. Methods may include reducing the resistivity of the fluid proximate the electrode using ionizing radiation to induce a transient increase in electrical conductivity of the fluid for the resistivity measurement.

Electrical earth borehole logging is well known, and various devices and techniques have been used for this purpose. Broadly speaking, there are two categories of devices used in electrical wellbore logging devices. In the first category, galvanic electrodes are used to inject current into an earth formation, and then the current or voltage drop is measured by sensing electrodes to measure signals sensitive to formation electrical properties. Galvanic-type well logging measurements may be carried out by the Laterolog, Microlaterolog, Array Lateral Log, and other tools. The Laterolog and Microlaterolog are taught in Doll, H. G., "The Laterolog", Paper 3198, in Transactions of the AIME, v 192, p. 305-316, 1951, and in Doll, H. G., "The Microlaterolog", Paper 3492, in Transactions of the AIME, v 198, p. 17-32, respectively.

In a second category, inductive excitation by coils is used to induce currents within the formation, and then the magnitude and phase of the induced current may be detected using an induction receiving antenna. We refer to a device as galvanic (or as an 'electrode device') for purposes of the present disclosure if some mud conductivity is required to inject current into the formation for the operation of the tool.

Induction tools do not require that there be any mud conductivity, but galvanic measurement tools have advantages over induction tools for some applications. Galvanic tools may achieve much better spatial resolution than can an inductive tool. Resistivity imaging tools have been in widespread use for several years for obtaining resistivity images of walls of boreholes drilled in an earth formation and are used to image bedding planes, dip, and so on.

U.S. Pat. No. 6,925,384 to Frenkel et al and U.S. Pat. No. 6,060,885 to Tabarovsky et al, the contents of each being fully incorporated herein by reference, provide example embodiments of the resistivity measurement techniques described herein, and discloses an apparatus and method for obtaining measurements indicative of a parameter of interest with a galvanic instrument responsive to a property of the earth formation proximate to the borehole.

Resistivity measurement information from a galvanic measuring device may be responsive primarily to parameters of an invaded zone and an uncontaminated zone surrounding the wellbore. A multi-component device may generate measurement data responsive primarily to vertical and horizontal resistivity of the earth formation. The data acquired from a galvanic measuring device may be inverted and, upon inversion, enable the creation of a layered model of the invaded zone and the uncontaminated zones. Results of the model may enable evaluation of formation resistivity data acquired from a deep-reading multi-component measuring device. The galvanic data may be acquired using a High-Definition Lateral Log and Microlaterolog (HDLL/MLL) or Dual Laterolog and Microlaterolog (DLL/MLL) devices, while the multi-component data may be acquired using a 3DEX device.

Unfortunately, high resistivity in borehole fluids, such as, for example, oil-based drilling fluids (e.g., oil-based muds, abbreviated, OBM) can negatively affect the performance of galvanic sensors in the borehole because the current must flow through a thin layer of nonconductive mud before it reaches the rock formation. Especially affected are formation resistivity measurements, with resistivity imaging in particular. An untreated oil-based mud's resistivity can be up 1 million ohm-meters, which is a conductivity of less than 0.001 milliSiemen/m. In order to use a galvanic resistivity logging tool, the mud resistivity is preferably reduced below 500 ohm-m, which corresponds to a conductivity that is greater than 2 mS/m. Representative values of the true connate-fluid-filled formation rock range from 0.2 ohm-m (5000 mS/m) to 2000 ohm-m (0.5 mS/m).

Previous attempts to provide a remedy to highly resistive muds include the use of mud additives to raise the conductivity of the mud filling the borehole. These additives are often carbon-based, but ionic liquids, polar esters, surfactants, and alcohols have also been used to make nonconductive oils electrically conductive. The use of additives complicates mud program design and drilling operations, and introduces the logistical considerations and expense of remediation. Common additives are typically quite difficult to clean up afterwards. Due to the considerable length and corresponding volume of the borehole, the use of additives may also be quite costly. Thus, increasing conductivity for a short period to enable local measurement by the sensor may be beneficial, especially if additives may be avoided.

A system's conductance is proportional to the number of ions formed and their mobility. In aspects of the invention, ionizing radiation (e.g., directly ionizing radiation such as beta particles, and indirectly ionizing radiation such as X-rays, gamma rays, and neutrons) is employed to momentarily induce electrical conductivity in oil-based mud (OBM) proximate the electrode device (e.g., around the pads) of electrical imaging tools while making a measurement, thereby allowing these tools to image well bores in otherwise non-conductive OBM without the expense and hassle of introducing conductive additives into the oil based mud. Any ionizing radiation may be employed, including alpha particles, beta particles, X-rays, gamma rays, ultraviolet radiation, and neutrons. Although ionizing radiation produced from a chemical source is compatible with aspects of the disclosure, ionizing radiation generated on demand may be preferable for some applications and reduces any health and safety concerns.

The paper "Yield of Free Ions in Irradiated Liquids; Determination by a Clearing Field," by Schmidt and Allen (hereinafter, 'Schmidt') describes increases in collected charge observed in liquids proportional to exposure to ionizing radiation. FIG. 1 shows observed charge-radiation dose curves representative of the findings of Schmidt. For doses of a sufficient magnitude, well over 99% of all the free ions formed were collected. In a later paper exploring the phenomenon of radiation induced conductance, "Free-Ion Yields in Sundry Irradiated Liquids," the pair determined the yield of free ion pairs formed by 2-MeV X-rays for a number of pure and mixed liquids.

The paper "Ion Yields in Hydrocarbon Liquids Exposed to X-rays of 5-30-keV Energy," by Holroyd and Sham (hereinafter, 'Holroyd') describes ionization observed in liquids exposed to X-rays. Holroyd postulates that the ionization results from the energetic electrons derived from the X-rays, particularly from the photoelectric effect, elastic scattering, and Compton scattering.

The momentary increase in conductivity may be defined as a reversible conductivity change experienced by the fluid (e.g., an oil-based mud) in response to applied ionizing radiation. Ionization occurs in the fluid when ionizing radiation supplies energy sufficient to generate at least one of: i) free ions; and ii) free electrons from atoms or molecules. The nominal conductivity of the fluid will return almost immediately upon cessation of applying radiation. The term "almost immediately" may vary, but generally may refer to a period of duration on the order of microseconds, or less. As one example, for a bremsstrahlung-based device, after a 1 microsecond X-ray pulse, the radiation induced electrical conductance transient in various hydrocarbons may have a conductivity half-life ranging from 5 microseconds to 44 microseconds.

Aspects of the present disclosure may allow for intermittent measurements by an electrode device. The fluid may be ionized, for example, for a few seconds. At a target conductivity of the fluid (e.g., approximately the highest conductivity to be achieved), the measurement is taken. The radiation may then be ceased and the fluid may be allowed to return to its nominal (e.g., non-ionized) conductivity, until the next measurement cycle begins. The waiting time between ionizations may be on the order of seconds, minutes, or longer. The electrical imaging measurement may be timed (e.g., electronically gated) so as to be done during the short time interval over which the mud is irradiated on demand.

In other examples, irradiating the fluid is carried out continuously while logging the borehole (e.g., during conveyance up or down the borehole) so that ever-different volumes of borehole fluid are irradiated over an interval of time. The measurement may be performed at intervals or substantially continuously while the measurement device is conveyed in the wellbore. A measurement cycle may be carried out by: i) applying the radiation continuously over a time interval; ii) conveying the electrode in the borehole during the time interval; iii) making a resistivity measurement with the electrode over the time interval such that the electrical conductivity of the fluid proximate the electrode is in a target range during the resistivity measurement; and iv) making additional resistivity measurements with the electrode over the time interval such that the electrical conductivity of the fluid proximate the electrode is in a target range during the additional resistivity measurements.

The present disclosure generally relates to evaluation of an earth formation, which may include exploration for hydrocarbons involving electromagnetic investigations of a borehole penetrating the earth formation. These investigations may include estimating at least one parameter of interest of the earth formation. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Figure 2:
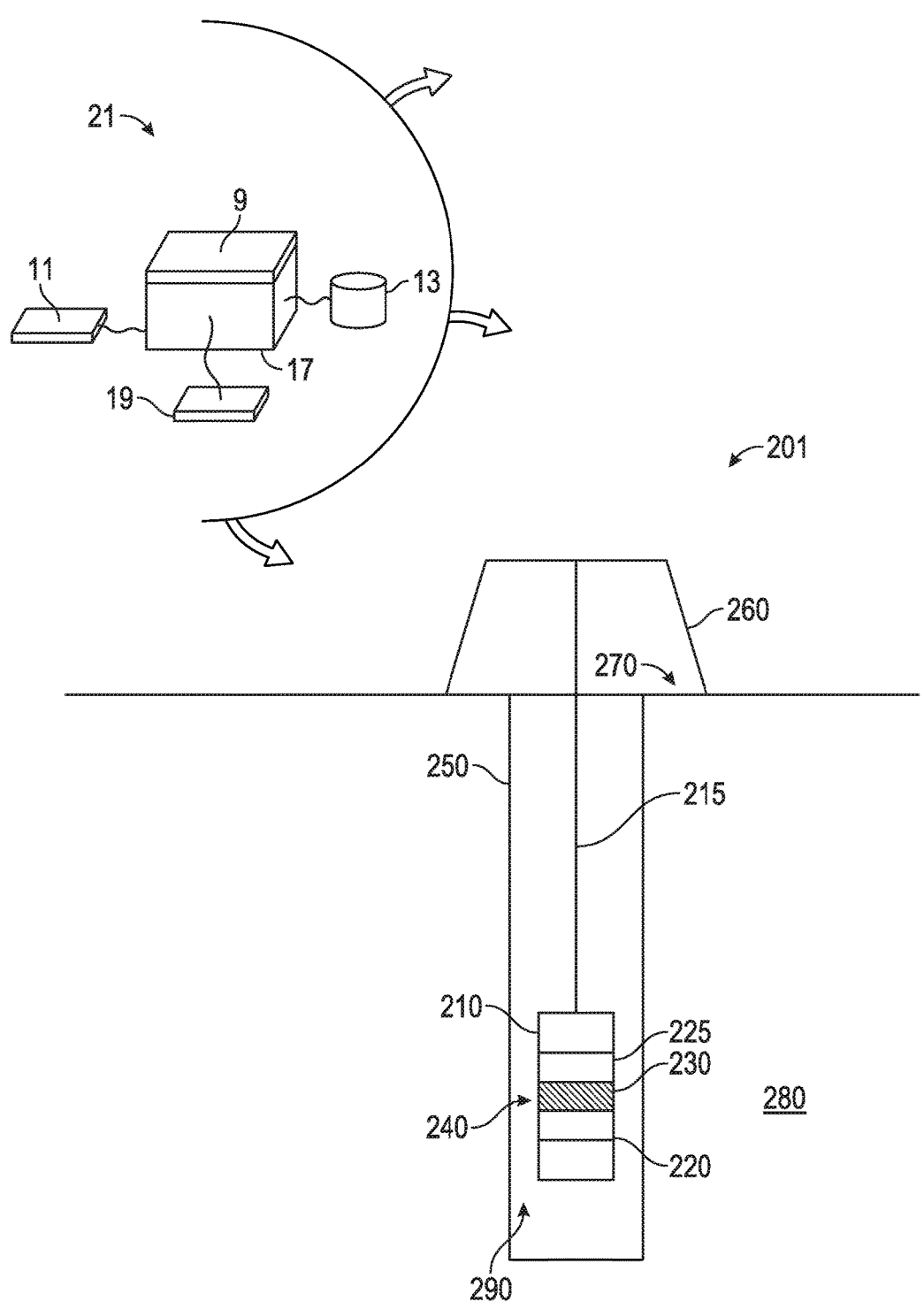
FIG. 2 schematically illustrates a system having a downhole tool configured to make resistivity measurements in a borehole intersecting a formation.

FIG. 2 schematically illustrates a system 201 having a downhole tool 210 configured to make resistivity measurements in a borehole 250 intersecting a formation 280. In one illustrative embodiment, the tool 210 may contain a electoral sensor unit 240, such as, for example, a pad, a ring electrode module, and so on. The sensor unit includes at least one electrode 220 (e.g., button electrode, ring electrode, etc.) which injects current into the formation to measure formation resistivity, and a source 230 of ionizing radiation. The system 201 is configured to mitigate effects of an electrical resistivity of the fluid 290 on the formation resistivity measurement by using ionizing radiation to induce a transient increase in electrical conductivity of the downhole fluid for the downhole measurement. In one example, sensor unit 240 includes two sets of ring electrodes 220 and 225, although additional electrode sets may be implemented.

Control systems, such as the at least one processor are configured to operate each of the system components to optimally carry out methods as described below, including, for example, conducting the measurement within a window of maximum conductivity of the fluid. By gating the resistivity measurement to the generation of ionizing radiation, the system reduces the resistivity of the fluid proximate the electrode using ionizing radiation to induce a transient increase in electrical conductivity of the fluid for the resistivity measurement. The sensor 240 may include sensors for estimating formation resistivity, dielectric constant, the presence or absence of hydrocarbons, porosity, salinity, fluid invasion, and so on.

The system 201 may include a conventional derrick 260 erected on a derrick floor 270. A conveyance device (carrier 215) which may be rigid or non-rigid, may be configured to convey the downhole tool 210 into wellbore 250 in proximity to formation 280. The carrier 215 may be a drill string, coiled tubing, a slickline, an e-line, a wireline, etc. Downhole tool 210 may be coupled or combined with additional tools (e.g., some or all the information processing system of FIG. 2). Thus, depending on the configuration, the tool 210 may be used during drilling and/or after the wellbore (borehole) 250 has been formed. While a land system is shown, the teachings of the present disclosure may also be utilized in offshore or subsea applications. The carrier 215 may include embedded conductors for power and/or data for providing signal and/or power communication between the surface and downhole equipment. The carrier 215 may include a bottom hole assembly, which may include a drilling motor for rotating a drill bit.

In order to operate the downhole tool 210 and/or provide a communications interface with at least one processor at the surface, the downhole tool 210 may include a downhole processor (not shown). In one embodiment, electronics (not shown) associated with the sensors may be configured to record information related to the parameters to be estimated. In some embodiments, the parameter of interest may be estimated using the recorded information.

In other embodiments, such electronics may be located elsewhere (e.g., at the surface). To perform estimation of a parameter during a single trip, the tool may use a "high bandwidth" transmission to transmit the information acquired by sensors to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in near real-time.

In some embodiments, processors may include electromechanical and/or electrical circuitry configured to control one or more components of the tool 210. In other embodiments, processors may use algorithms and programming to receive information and control operation of the tool 210. Therefore, processors may include an information processor that is in data communication with a data storage medium and a processor memory. The data storage medium may be any standard computer data storage device, such as a USB drive, memory stick, hard disk, removable RAM, EPROMs, EAROMs, flash memories and optical disks or other commonly used memory storage system known to one of ordinary skill in the art including Internet based storage. The data storage medium may store one or more programs that when executed causes information processor to execute the disclosed method(s). Herein, "information" may include raw data, processed data, analog signals, and digital signals.

Each of the embodiments herein may be used in a variety of settings in both drilling and non-drilling environments. In some implementations, the disclosed embodiments may be used as part of a drilling system. It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

Downhole tool 210 may be coupled or combined with additional tools including some or all the hardware environment 21 shown inset, in FIG. 2. The hardware environment may implement one or more control units configured to operate the tool 210 or other components of system 201, and/or conduct method embodiments disclosed below. Certain embodiments of the present disclosure may be implemented with a hardware environment 21 that includes an information processor 17, an information-storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensor devices, such as, for example, electrode devices, may be used in evaluating the formation in accordance with embodiments disclosed herein. As one example, particular embodiments may employ the techniques disclosed herein in connection with various types of induction logging, including multi-component induction logging.

Figures 3A, 3B:
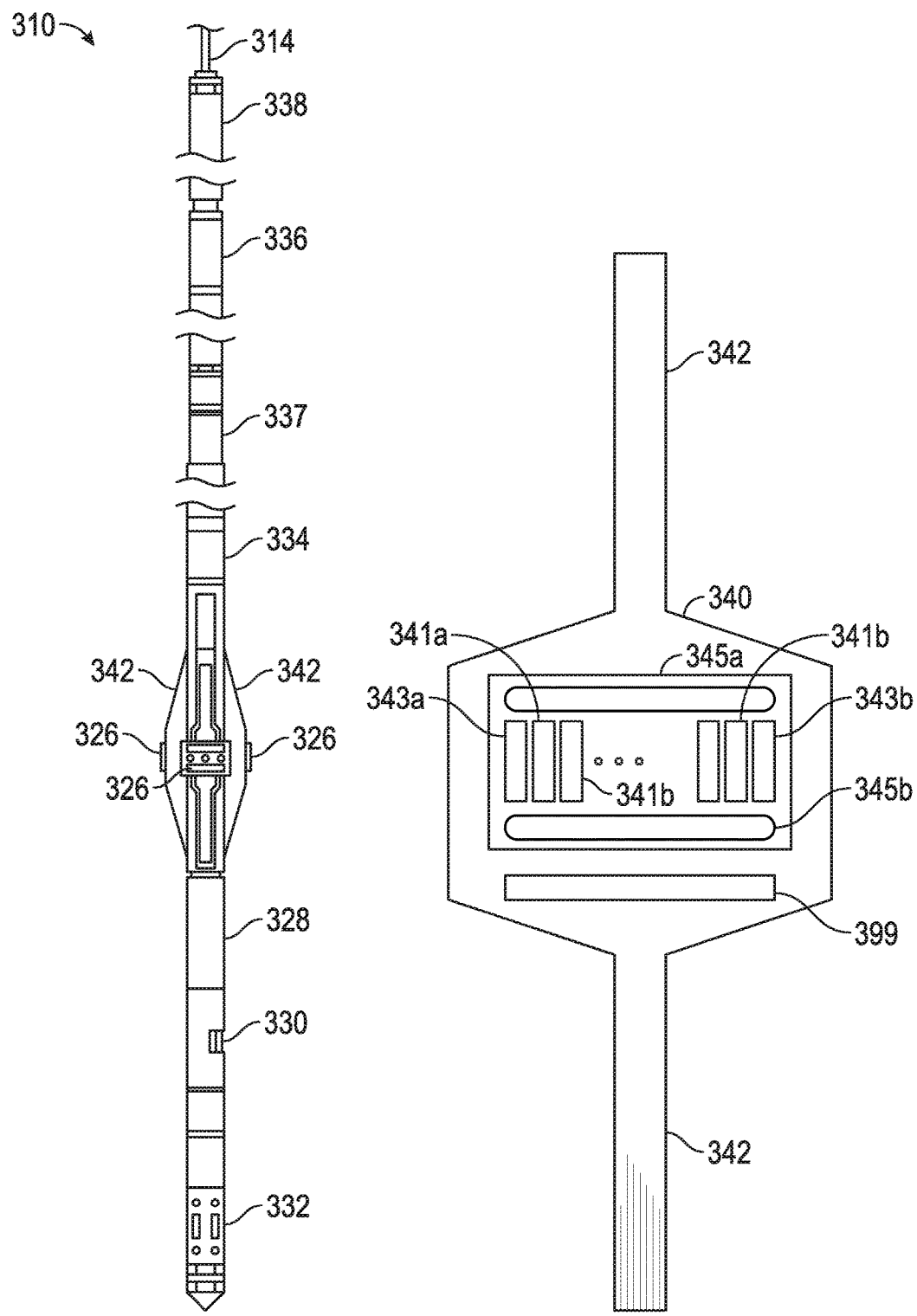
FIG. 3A shows a schematic external view of an exemplary borehole sidewall imager tool in accordance with embodiments of the present disclosure.
FIG. 3B shows a schematic external view of an exemplary galvanic pad in accordance with embodiments of the present disclosure.

FIG. 3A shows a schematic external view of an exemplary borehole sidewall imager tool 310 in accordance with embodiments of the present disclosure. The tool 310 comprising the imager system may include resistivity arrays 326 and, optionally, a mud cell 330 and a circumferential acoustic televiewer 332. The resistivity arrays 326 may be secured to extendable arms such as 342. Hydraulic or spring-loaded caliper-arm actuators (not shown) of any well-known type extend the pads 340 and their electrodes 341, 343, 345 against the borehole 312 sidewall for resistivity measurements. In addition, the extendable caliper arms 342 may provide the actual measurement of the borehole diameter, as is well known in the art.

Also on the pads 340 are irradiation assemblies 399 serving as a source of ionizing radiation for the fluid 290 (FIG. 2) proximate the arrays 326. Electronics modules 328 and 338 may be configured to operate the irradiation assemblies 399 in cooperation with resistivity arrays 326, as described above. Alternatively, electronic modules 328 and 338 may be located at other suitable locations in the system.

Referring to FIGS. 3A and 3B, each array 326 includes one or more measure electrodes 341 $a$, 341 $b$, . . . 341 $n$ (collectively 341) for injecting electrical currents into the formation. FIG. 3C shows an equivalent circuit of one embodiment of an exemplary resistivity array 326 in accordance with embodiments of the present disclosure. A pad body 340 may serve as a return electrode, which may replace or augment return electrodes 345 $a,b$. When using a pad body 340 in place of return electrodes 345 $a,b$, all current emitted from the measure electrodes 341 may return through pad body 340. At least one measure electrode 341 may be electrically connected to a power source (e.g., voltage or current) through a converter. Current imparted from the at least one measurement electrode 341 into formation may return through pad body 340.

Figure 4:
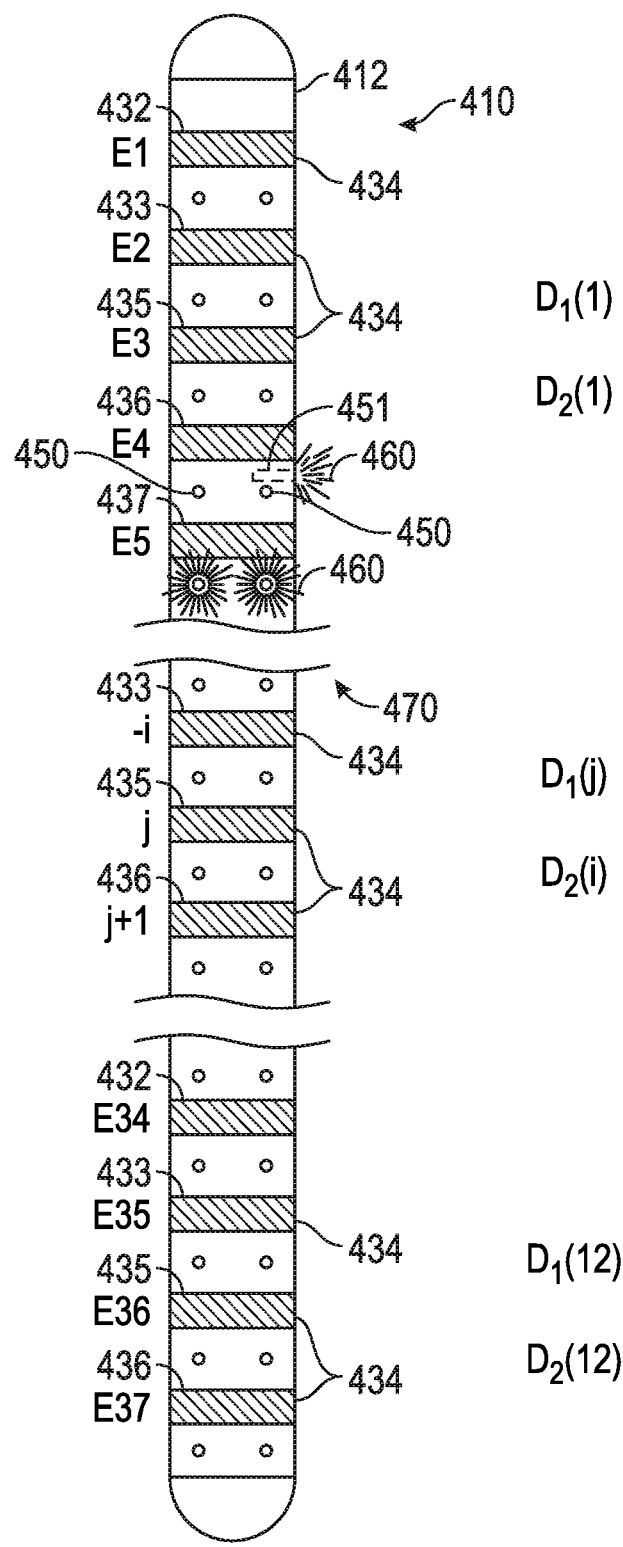
FIG. 4 illustrates a galvanic measurement device for determining resistivity of a geological formation surrounding a borehole in accordance with embodiments of the present disclosure.

FIG. 4 illustrates a galvanic measurement device for determining resistivity of a geological formation surrounding a borehole in accordance with embodiments of the present disclosure. Instrument 410 includes a mandrel 412 carrying a single source electrode 432 and a plurality of measuring electrodes 433, 435, 436, 437, and the like vertically spaced in equal increments along the axis of the mandrel 412. The number of measuring electrodes chosen for this example is 36, which including the source electrode, makes a total of 37 electrodes which are referenced as E1-E37.

Positioned between and around measuring electrodes 433, 435, 436, 437, and the like are miniature X-ray generation tubes 450, 451. Miniature X-ray generation tubes 450, 451 are shown in FIG. 4 as being oriented transverse to the longitudinal axis of the mandrel 412 and the borehole with tube 450 being oriented at an angle to tube 451 in the x-y plane, but a multitude of other orientations with respect to the mandrel 412 and with respect to one another may be employed. Each of miniature X-ray generation tubes 450, 451 may be activated in association with measurement by measuring electrodes 433, 435, 436, 437 to provide X-rays 460 to the borehole annulus 470 proximate the electrodes.

A group 434 of three successive electrodes 433, 435, and 436 may be used to obtain measurements, such as, for example, measurements of first potential difference (D1). For measurement of this potential difference, the source electrode 432 injects an electrical current of a predetermined value into the formation and it is received by successive lower vertical groups of three electrodes (e.g., 434' and 434"). The 36 measuring electrodes produce 12 measurements from successive electrode groups 434, 434', 434" and the like for measuring the first potential difference. Thus, at 434-D1 (1), at 434'-D1 (j), and at 434"-D1 (12) are estimated. Examining the electrode group identified as 534', the first vertically disposed measurement electrode is identified as j−1 (433'), the center electrode is identified as j (435'), and the third or lower electrode is identified as j+1 (536'). The first potential difference D1 (j) is calculated as: D 1 (j)=V j+1−V j−12.

Accordingly, each measurement unit provides first differences, D1 at each depth level. The differential conductance is also available at each logging depth. The galvanic measuring device generally provides information of the structure of the conductive near wellbore environment, while the multi-component measuring device generally obtains information on parameters far from the measurement tool. As shown in Frenkel, and known in the art, parameters of an isotropic invaded zone and horizontal resistivity of an uncontaminated zone may be determined via inversion processing of the galvanic data.

Figure 5:
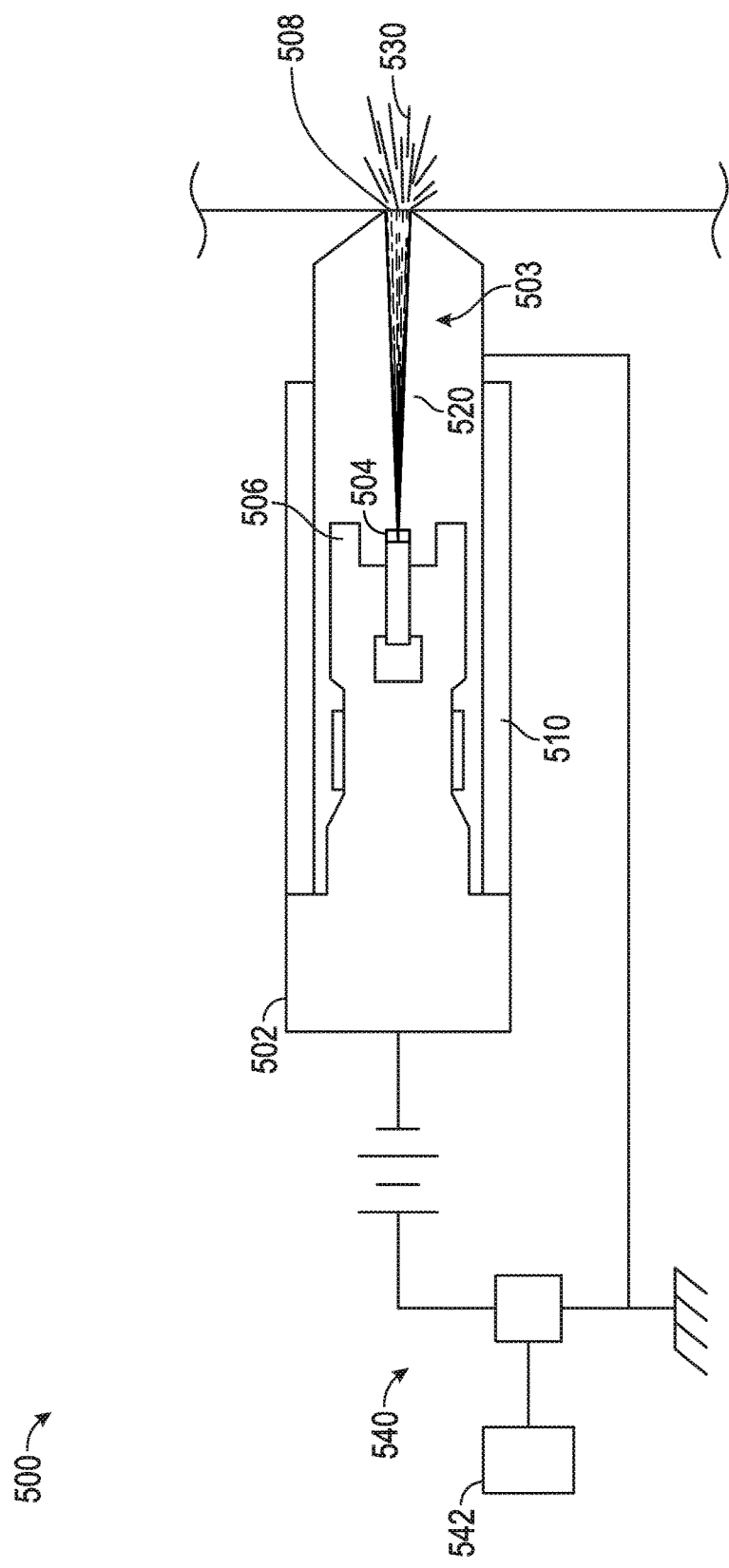
FIG. 5 illustrates an irradiation assembly in accordance with embodiments of the present disclosure.

FIG. 5 illustrates an irradiation assembly in accordance with embodiments of the present disclosure. The irradiation assembly 500 comprises a miniature X-ray generation tube 502 and associated circuitry 540, including, for example, one or more processors 542. The X-ray tube 502 may have a diameter of approximately 10 millimeters and a length of approximately 50 millimeters.

The X-ray tube 502 has a diode structure, comprising a carbon nanotube cathode tip 504 and a focusing electrode 506 on one side and a transmission-type X-ray target 508 on the other side. The target may comprise one or more metals. For example, the target may be implemented as a tungsten-coated machined beryllium X-ray window. For greater mechanical strength under high pressure and chemical resistance in corrosive muds, X-ray windows made out of diamond may be used. The cathode tip 504 may be positioned inside the focusing electrode 506 so that the two are coaxial. The target 508 may be frustoconical in shape. High-voltage insulation 510 between the cathode tip 504 and the X-ray target 508 may be provided by an alumina-ceramic tube or the like.

In operation, electrons 520 are accelerated in a vacuum by an electric field and propelled into the metallic target. The focusing electrode 506 operates to focus a generated electron beam 503 at the cathode tip 504 and attract the beam to target 508. X-rays 530 are emitted according to the bremsstrahlung phenomena as the electrons are decelerated in the metal of the target. That is, the kinetic energy of the particle is converted to a photon. A continuous spectrum of X-rays may thus be emitted. For some implementations, details of constructing X-ray tube 502 may be found in Heo et al, "A vacuum-sealed miniature X-ray tube based on carbon nanotube field emitters." Nanoscale Research Letters 2012, 7:258.

The miniature X-ray generation tube 502 may be actuated via a voltage applied between the cathode and the target by the circuitry. This may be accomplished by floating the cathode and the focusing electrode in negatively high voltage while the X-ray target is maintained at ground.

Figure 6:
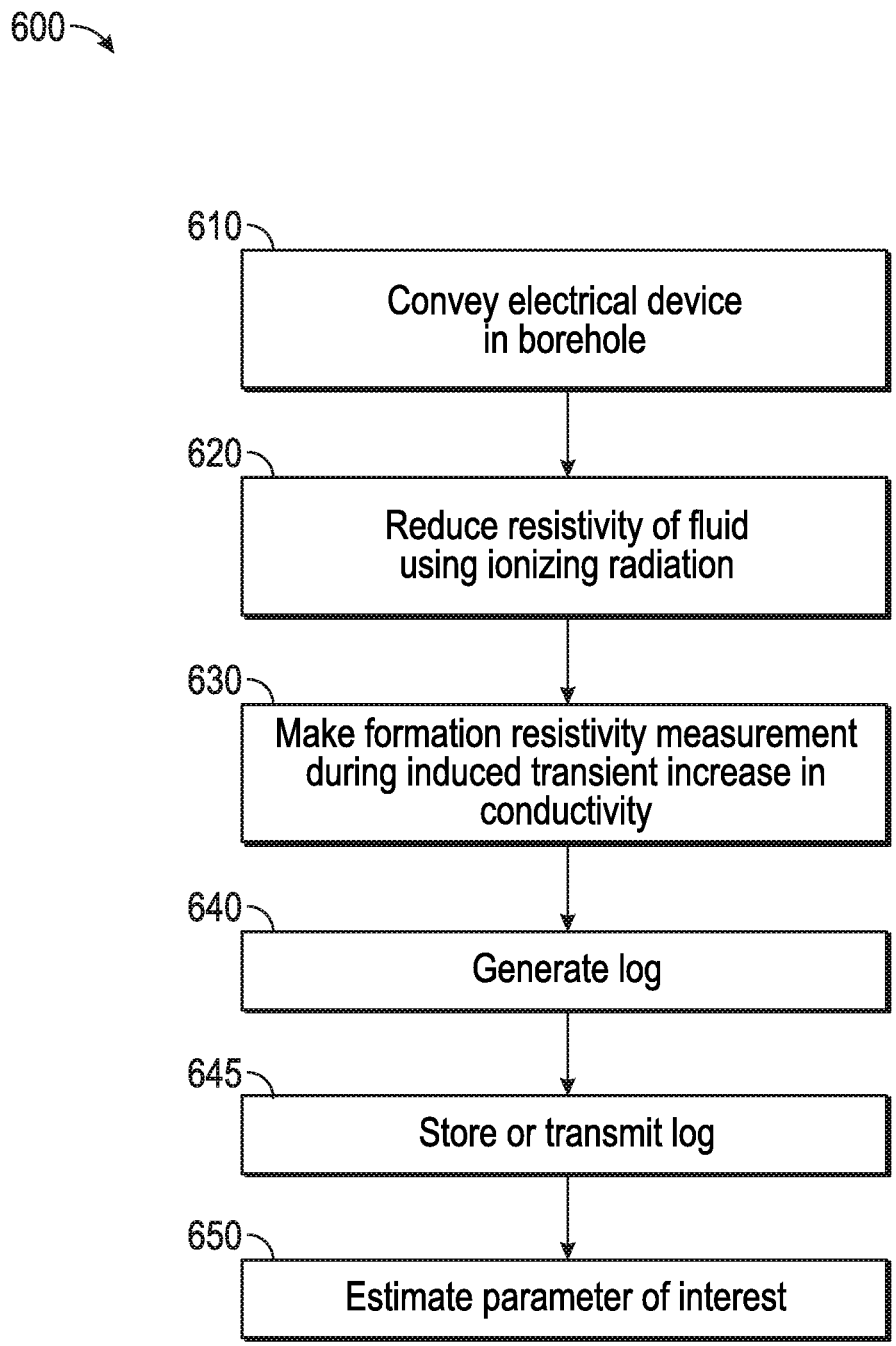
FIG. 6 shows a flow chart illustrating methods for estimating at least one parameter of an earth formation according to one embodiment of the present disclosure.

FIG. 6 shows a flow chart 600 illustrating methods for estimating at least one parameter of an earth formation according to one embodiment of the present disclosure. In optional step 610, a electrode device responsive to the formation resistivity is conveyed in a borehole using a carrier. The borehole is filled with fluid which may be substantially non-conductive in nominal operation, such as, for example, non-conductive borehole drilling fluid (e.g., oil-based mud). In the borehole, a formation resistivity measurement is taken. Step 620 includes reducing the resistivity (i.e., increasing conductivity) of the fluid proximate the electrode using ionizing radiation to induce a transient increase in electrical conductivity of the fluid for the resistivity measurement. The ionizing radiation may be at least one of i) X-rays; ii) gamma rays; iii) alpha radiation; iv) beta radiation; v) ultraviolet radiation; and vi) neutrons.

Ionization of the proximate borehole fluid may be carried out by generating ionizing radiation from a radiation source associated with the electrode device. The radiation source may be, for example, a pulsed neutron generator, or a bremsstrahlung X-ray assembly. Generation of the ionizing radiation with the radiation source may be carried out by using the ionizing radiation to generate at least one of free ions and free electrons, and may be carried out for at least one of i) immediately before the resistivity measurement, and ii) during the resistivity measurement. For example, the downhole measurement may be taken within 5 microseconds of the application of radiation.

In step 630, a formation resistivity measurement may be made while the fluid experiences the transient increase in conductivity. In this way, effects of an electrical resistivity of the fluid on the resistivity measurement are mitigated. This measurement may be obtained with an electrode in contact with the borehole fluid. Thus, step 630 may include determining timing of actuating the electrode device to make measurements. The step may be configured to make measurements when the electrode is in a desired location in the borehole and the conductivity of the proximate fluid is within a target conductivity.

Step 630 may include sensing the conductivity of the fluid, the irradiation of the fluid, or deriving the conductivity from other related parameters, to determine when a target conductivity is reached. Timing of measurements may also be calculated using pre-determined data tables which may be adjusted for calibration, and thus may include a calculated or preset amount of time from actuation of the radiation source to initiation of the resistivity measurement. Empirical data may be used to model fluid behavior and measurement quality.

In some embodiments, step 630 may include performing a measurement cycle comprising: i) applying the radiation over a first time interval; ii) making the resistivity measurement with the electrode while the electrical conductivity of the fluid proximate the electrode is in a target range; and iii) allowing the fluid to return to a nominal borehole conductivity by ceasing application of the radiation and waiting for a second time interval before repeating the measurement cycle.

In other embodiments, step 630 may include performing a measurement cycle comprising: i) applying the radiation continuously over a time interval; ii) conveying the electrode in the borehole during the time interval; and iii) making a resistivity measurement with the electrode over the time interval such that the electrical conductivity of the fluid proximate the electrode is in a target range during the resistivity measurement; and iv) making additional resistivity measurements with the electrode over the time interval such that the electrical conductivity of the fluid proximate the electrode is in a target range during the additional resistivity measurements. Step 630 may include conducting measurements over a plurality of borehole depths.

Step 640 comprises generating a log of the resistivity measurements from the electrode containing information derived to the formation measurement. The log may include estimated formation resistivity values as a function of borehole depth. Optional step 645 comprises performing at least one of: i) storing the log on a on a non-transitory machine-readable medium; and ii) transmitting the log to another processor. Herein, "information" may include raw data, processed data, analog signals, and digital signals.

In step 650, at least one parameter of interest may be estimated using the information relating to the formation measurement from the electrode. The parameter of interest may include a physical characteristic of a volume of interest of the formation, such as, for example, the volume of interest surrounding the borehole proximate the electrode. The parameter of interest may include formation resistivity, formation conductivity, distance to an interface, and so on. Estimation of the parameter may include the use of a model. In some embodiments, the model may include, but is not limited to, one or more of: (i) a mathematical equation, (ii) an algorithm, (iii) an deconvolution technique, and so on.

Estimated parameters of interest may be stored (recorded) as information or visually depicted on a display. The parameters of interest (or other formation resistivity measurement information) may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Control of components of apparatus and systems described herein may be carried out using one or more models as described above. For example, at least one processor may be configured to modify operations i) autonomously upon triggering conditions, ii) in response to operator commands, or iii) combinations of these. In drilling contexts, such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, configuration of the processor may include operative connection with resident memory and peripherals for executing programmed instructions.

"Nominal conductivity" or "nominal resistivity" of a fluid may be defined as the conductivity or resistivity the fluid would be but for the effects of ionizing radiation. The target resistivity range is the desired or planned resistivity for the fluid for taking measurements. Fluid may be said to be proximate the electrode if conductivity of the fluid affects the measurement of the electrode device. Method embodiments may include conducting further operations in the earth formation in dependence upon the formation resistivity information, the logs, estimated parameters, or upon models created using ones of these. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

Ionizing radiation is defined herein to mean radiation that carries enough energy to free electrons from atoms or molecules, thereby ionizing them, and includes indirectly ionizing radiation. The term "indirectly ionizing radiation" as used herein means that a predominance of the ionization of the radiation results from secondary collisions of some energetic charged particle (an electron in the case of X-rays or gamma rays and a proton in the case of neutrons) that the indirectly ionizing radiation initially set free. For example, X-rays and gamma rays can knock an electron free by photoelectric effect or by Compton scattering—this energetic electron then causes secondary ionization. In contrast, neutrons can transfer enough of their energy to the proton in a hydrogen atom to remove that proton from the hydrogen atom. The energetic proton then causes considerable ionization along its path as it loses its kinetic energy.

Embodiments of the invention may use any electrodes device known in the art, including button electrodes, ring electrodes, and toroid electrodes. One of ordinary skill in the art would appreciate that an electrode device includes a current injector and a sensor for detecting currents that flow back to the tool. In this description, the term "electrode" may be used in a general sense to refer to an electrode device and is not limited to any particular type of electrode device.

While the foregoing disclosure is directed to the one mode embodiments of the disclosure, various modifications will be apparent to those skilled in the art. It is intended that all variations be embraced by the foregoing disclosure.

What is claimed is:

1. An apparatus for making a formation resistivity measurement of an earth formation in a borehole filled with fluid, the apparatus comprising:
    an electrode configured to inject current into the formation via the fluid;
    at least one processor configured to make a resistivity measurement indicative of the resistivity of the earth formation responsive to the injected current; and
    a radiation source configured to reduce the resistivity of the fluid proximate the electrode using ionizing radiation to induce a transient increase in electrical conductivity of the fluid proximate the electrode for the resistivity measurement.

2. The apparatus of claim 1, comprising a conveyance device configured to convey the electrode and the radiation source in the borehole.

3. The apparatus of claim 2, wherein the radiation source comprises a source of at least one of i) x-rays; ii) gamma rays; iii) alpha radiation; iv) beta radiation; v) ultraviolet radiation; and vi) neutrons.

4. The apparatus of claim 3, wherein the radiation source comprises a bremsstrahlung x-ray assembly.

5. A system for making a formation resistivity measurement of an earth formation in a borehole filled with fluid, the system comprising:
    a tool comprising:
        a tool body;
        an electrode configured to inject current into the formation via the fluid;
        a radiation source configured to reduce the resistivity of the fluid proximate the electrode using ionizing radiation to induce a transient increase in electrical conductivity of the fluid proximate the electrode for the resistivity measurement;
        circuitry configured to perform a measurement cycle in a borehole intersecting an earth formation; and
        a conveyance device configured to convey the tool in the borehole.

6. The system of claim 5, wherein the measurement cycle comprises: i) applying the radiation over a first time interval; ii) making the resistivity measurement with the electrode while the electrical conductivity of the fluid proximate the electrode is in a target range; and iii) allowing the fluid to return to a nominal borehole conductivity by ceasing application of the radiation and waiting for a second time interval before repeating the measurement cycle.

7. The system of claim 5, wherein the measurement cycle comprises: i) applying the radiation continuously over a time interval; ii) conveying the electrode in the borehole during the time interval; and iii) making a resistivity measurement with the electrode over the time interval such that the electrical conductivity of the fluid proximate the electrode is in a target range during the resistivity measurement; and iv) making additional resistivity measurements with the electrode over the time interval such that the electrical conductivity of the fluid proximate the electrode is in a target range during the additional resistivity measurements.

8. The method of claim 5, further comprising a pad associated with the tool body, wherein the electrode and the bremsstrahlung assembly are each disposed on the pad.

* * * * *